United States Patent [19]
Duke et al.

[11] Patent Number: 5,638,165
[45] Date of Patent: Jun. 10, 1997

[54] CRACK DETECTION SYSTEM

[75] Inventors: Philip A. Duke, Brough; Andrew Ball, Farnborough, both of Great Britain

[73] Assignee: British Aerospace Public Limited Company, Farnborough, United Kingdom

[21] Appl. No.: 430,593

[22] Filed: Apr. 28, 1995

[30]    Foreign Application Priority Data

Apr. 28, 1994 [GB]  United Kingdom .................. 9409553

[51] Int. Cl.$^6$ ............................................. G01L 1/00
[52] U.S. Cl. ........................ 356/32; 73/802; 250/227.16
[58] Field of Search ............... 356/32, 73.1; 250/227.16, 250/227.14

[56]    References Cited

U.S. PATENT DOCUMENTS

| | | |
|---|---|---|
| 4,477,725 | 10/1984 | Asawa et al. ................ 250/227.16 |
| 4,692,610 | 9/1987 | Szuchy .............................. 356/32 |
| 5,026,141 | 6/1991 | Griffiths . | |
| 5,148,017 | 9/1992 | Wolff et al. . | |
| 5,330,136 | 7/1994 | Colbaugh .................... 250/227.16 |
| 5,378,889 | 1/1995 | Lawrence .................... 250/227.16 |

FOREIGN PATENT DOCUMENTS

| | | |
|---|---|---|
| 2165118 | 4/1985 | United Kingdom . |
| 2166020 | 4/1986 | United Kingdom . |
| 2190262 | 11/1987 | United Kingdom . |
| 2242519 | 10/1991 | United Kingdom . |
| 2250811 | 6/1992 | United Kingdom ............... 356/32 |
| 9115788 | 10/1991 | WIPO . |

*Primary Examiner*—Richard A. Rosenberger
*Attorney, Agent, or Firm*—Cushman, Darby & Cushman IP Group of Pillsbury Madison & Sutro LLP

[57]    ABSTRACT

An apparatus and method for utilizing the deformation characteristics of optical fiber transmission paths to enable the detection of deformations in materials, in which the fibers are disposed in relation to the material such that each separate deformation in the material lying in the path of the fiber results in a corresponding independently measurable deformation along the length of the fiber.

6 Claims, 1 Drawing Sheet

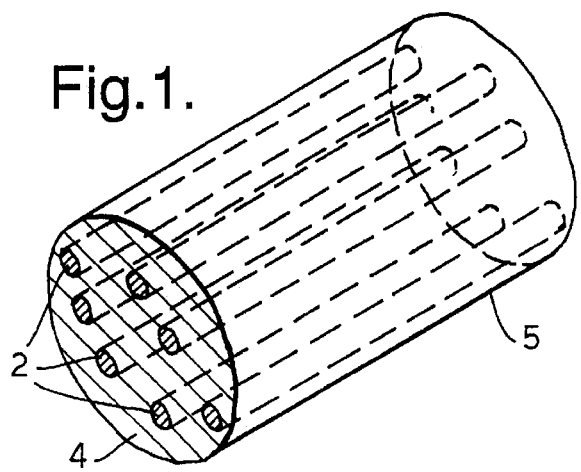
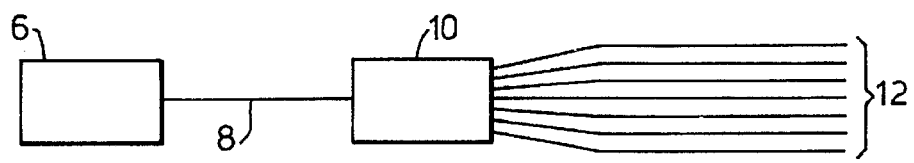
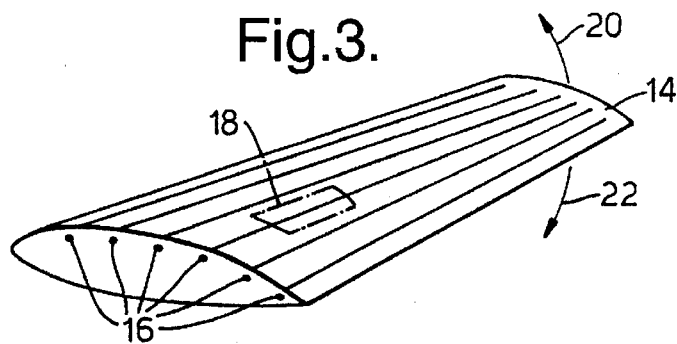
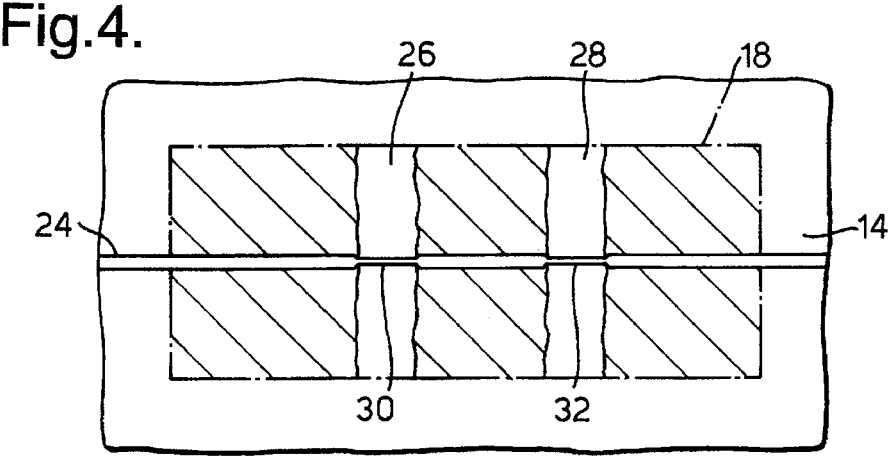

CRACK DETECTION SYSTEM

The invention relates to the field of crack and deformation detection in materials and more specifically to the utilisation of the specific material properties of polymer optical transmission paths in the detection of the said deformities.

BACKGROUND OF THE INVENTION

The utilisation of both glass fibre and polymer waveguides in optical methods of monitoring and detecting deformations within structural materials is well documented. To detect material failures, optical fibres are normally bonded to various locations on the surface of structures or embedded in the matrix of a composite materials such that when cracks or significant deformations occur in the said material the optical fibre's break at the position of deformation on the surface of or within the structure. By utilising optical time domain reflectometry techniques the positions of the fibre fractures can be calculated and thus the active monitoring and measurement of specific material failure characteristics is possible.

The major drawback with the current methods of crack detection utilising optical fibres is that once the test fibre has broken no further information relating to events any further along the fibre path can be recorded and subsequently the fibre must be replaced to resume analysis.

SUMMARY OF THE INVENTION

According to our invention in one aspect thereof there is provided apparatus for the detection of deformation in a material comprising at least one optical fibre defining an optical transmission path within a material. The at least one fibre is adapted for connection to an optical time domain reflectometry system, and so disposed within the material that deformation of the material results in a corresponding deformation of the optical transmission path the location of which may be determined by the optical time domain reflectometry system.

According to our invention in a further aspect thereof, there is provided a method for utilising the deformation characteristics of optical fibres defining optical transmission paths to enable the detection of deformities in a material. The method includes the steps of disposing the fibres within the material such that each separate deformation in the material results in a corresponding independently measurable deformation of the fibres.

BRIEF DESCRIPTION OF THE DRAWINGS

The invention will now be described by way of a non limiting example in which:

FIG. 1 is an illustrative sectional diagram showing a series of optical transmission fibres embedded in a material matrix;

FIG. 2 is a block diagram showing an arrangement of optical test and recording equipment;

FIG. 3 is an illustrative diagram showing optical fibres applied in accordance with the invention to a wing structure; and FIG. 4 is an illustrative diagram showing an enlarged area of FIG. 3.

DETAILED DESCRIPTION OF THE PREFERRED EMBODIMENTS

In FIG. 1, optical fibres 2 are embedded in a matrix 4 of a fibre reinforced composite material 5 which in turn forms part of a load bearing structure, for example a wing skin section. Optical fibres are typically in the order of 10 to 50 micrometers in diameter, but advances in fibre manufacture may facilitate the use of substantial smaller diameter fibres.

Referring to FIG. 2 the optical fibres 2 of FIG. 1 (shown as a group 12) are arranged within the matrix of a composite material 5 such that the ends of each fibre are connected to an optical splitter 10 which in turn is connected via an input fibre 8 to an optical time domain reflectrometer 6.

FIG. 3 shows a typical application of the invention whereby a plurality of optical fibres 16 are embedded in the surface of an aircraft wing 14 and arranged so as to lie substantially perpendicular to the expected direction of material failures within that structure. As the wing undergoes deformation in modes typical to that identified by arrows 20 and 22 the surfaces of the wing structure will correspondingly undergo repeated compressive and tensile loadings, thus increasing the probability of mechanical failures within the wing structure.

FIG. 4 shows an enlarged plan view of an area 18 on the wing of FIG. 3, showing one optical fibre 24 so disposed in location to the wing structure such that under the action of structural loading, in directions 20 and 22, mechanical failures or cracks occur in locations such as that shown areas 26 and 28. The fibre 24 possesses characteristics such that in response to these mechanical failures it's extension over areas 26 and 28 causes corresponding strain deformations or necking of the fibre in positions 30 and 32.

In use, the optical time domain reflectrometer 6 sends a series of light pulses along fibre 8 which are then directed into the plurality of optical fibres 12 by the action of the optical splitter 10. If, in the wing section under analysis, there are any mechanical failures such as 26 and 28 which correspond to fibre positions along the wing there will be produced corresponding strain deformations 30 and 32 causing modifications to the timed response of the reflected light signal back from the fibre 24 through the optical splitter 10 to the optical time domain reflectrometer 6. The changes in the timed response to reflected light signals can be calibrated such that the positions of structural failures 26 and 28 in relation to the wing structure under test 14 can accurately be established in association with the magnitude of the structural deformations there present.

It will be appreciated by those skilled in the art that the apparatus and method herein described may be applied to various forms of structural testing including building construction, automotive engineering, marine engineering and associated technologies wherein there is a requirement to monitor the structural integrity of materials under load. Additionally the optical fibres may be manufactured from a number of materials including glass, polymers and other materials capable of facilitating optical time domain reflectometry.

We claim:

1. Apparatus for the detection of deformations in a material comprising:

at least one optical fibre defining an optical transmission path within said material, said at least one optical fiber being adapted for connection to an optical time domain reflectometry system, and being so disposed within said material that deformation of said material results in a corresponding longitudinal strain deformation in the form of necking of said optical fibre, the location and magnitude of which may be determined by said optical time domain reflectometry system.

2. The apparatus of claim 1, wherein said optical fiber extends within said material in a substantially straight direction.

3. A method of utilizing longitudinal strain deformation characteristics in the form of necking of optical fibres defining optical transmission paths to enable the detection of deformations in a material, said method comprising the steps of:

disposing said optical fibres within said material such that deformations in the material result in a corresponding independently measurable longitudinal strain deformations in the form of necking of said optical fibres; and measuring said deformations.

4. The method of claim 3, wherein said optical fiber extends within said material in a substantially straight direction.

5. Apparatus for detecting deformation in a material, comprising:

a composite material including at least one optical fibre extending substantially straight within said composite material in a given direction and defining an optical transmission path inside said composite material;

said optical fibre being so disposed within said composite material that a mechanical failure or crack in the composite material at a particular location due to deformation of said composite material in opposite directions substantially perpendicular to said given direction causes longitudinal strain in the form of necking of said at least one optical fibre at a location corresponding to said particular location; and an optical time domain reflectometer connected to said at least one optical fibre for determining the location and magnitude of said necking of said optical fibre and hence of the mechanical failure or crack in said composite material.

6. A method of detecting deformations in a material, comprising the steps of:

disposing at least one optical fiber in said material such that said optical fibre extends substantially straight within said material in a given direction and defines an optical transmission path inside said composite material;

said optical fibre being so disposed within said composite material that a mechanical failure or crack in the composite material at a particular location due to deformation of said composite material in opposite directions substantially perpendicular to said given direction causes longitudinal strain in the form of necking of said at least one optical fibre at a location corresponding to said particular location; and connecting an optical time domain reflectometer to said at least one optical fiber to determine a location and magnitude of said necking of said optical fibre and hence the mechanical failure or crack in said material.

* * * * *